(12) United States Patent
Matsuoka

(10) Patent No.: US 6,970,269 B1
(45) Date of Patent: Nov. 29, 2005

(54) PATCH IMAGE PREPARATION METHOD AND RECORDING MEDIUM THEREFOR

(75) Inventor: Hirochika Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 09/628,347

(22) Filed: Jul. 28, 2000

(30) Foreign Application Priority Data

Jul. 30, 1999 (JP) ............................ 11-217217
Jul. 12, 2000 (JP) ............................ 2000-211210

(51) Int. Cl.⁷ .......................... G06F 15/00; G06K 9/00
(52) U.S. Cl. ....................................... 358/1.9; 382/165
(58) Field of Search .......................... 358/1.9, 518, 523, 358/537, 538, 539, 540, 1.14, 526; 382/167, 382/175, 165

(56) References Cited

U.S. PATENT DOCUMENTS

| | | | |
|---|---|---|---|
| 4,907,076 A * | 3/1990 | Ohsawa | ...................... 358/515 |
| 5,142,374 A * | 8/1992 | Tajika et al. | .................. 358/3.1 |
| 5,566,372 A | 10/1996 | Ikeda et al. | .................. 355/208 |
| 5,752,126 A | 5/1998 | Muramatsu | .................. 399/44 |
| 5,974,171 A * | 10/1999 | Hayashi et al. | ............. 382/162 |
| 6,438,271 B1 * | 8/2002 | Usami et al. | ............... 382/274 |
| 6,454,390 B1 * | 9/2002 | Takahashi et al. | ............ 347/41 |
| 6,633,667 B1 * | 10/2003 | Matsuoka | ................... 382/162 |

FOREIGN PATENT DOCUMENTS

JP 402165422 A * 6/1990 ............ G11B 7/00

* cited by examiner

Primary Examiner—Madeleine Nguyen
(74) Attorney, Agent, or Firm—Fitzpatrick, Cella, Harper & Scinto

(57) ABSTRACT

The invention is to relax the influence of noise with patch images of a number as small as possible, in consideration of the correlation of noise. For attaining this objective, in the preparation of a patch image to be used for generating image processing data, the patch image is made to include plural patches of a same color and such plural patches of the same color are so arranged as to reduce the mutual influence of the noise color signals by the self correlation of the noise color signal in the plural patches of the same color.

8 Claims, 16 Drawing Sheets

▦ AREA Au WHERE COLOR HAS BEEN ALREADY ARRANGED
▨ AREA Ac WHERE CORRELATION WITH CONCERNED-COLOR PATCH ALREADY ARRANGED IS HIGH

☰ ARRANGEABLE AREA Aa

▦ AREA Au WHERE COLOR HAS BEEN ALREADY ARRANGED
▨ AREA Ac_c WHERE CORRELATION WITH Ce-COLOR PATCH ALREADY ARRANGED IS HIGH

▤ REARRANGEABLE AREA Ac_a

▦ AREA Aua WHERE COLORS ARE ARRANGED OVER ALL PAGES
▨ AREA Ac WHERE CORRELATION WITH CONCERNED
  -COLOR PATCH ALREADY ARRANGED IS HIGH
▒ AREA Aup WHERE COLORS ARE ARRANGED ON PART OF PAGES

▤ ARRANGEABLE AREA Aa

▦ AREA Aua WHERE COLORS ARE ARRANGED OVER ALL PAGES
▨ AREA Ac_c WHERE CORRELATION WITH Ce-COLOR PATCH ALREADY ARRANGED IS HIGH
▦ AREA Aup WHERE COLORS ARE ARRANGED ON PART OF PAGES

▦ REARRANGEABLE AREA Ac_a

FIG. 16
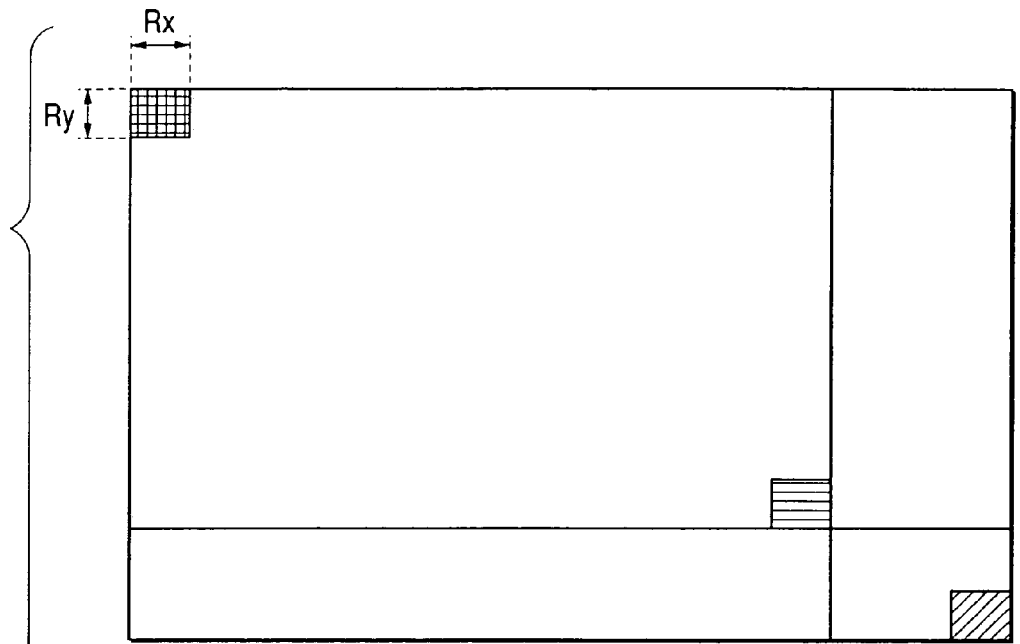
FUNDAMENTAL PATCH IMAGE $I_{org}$
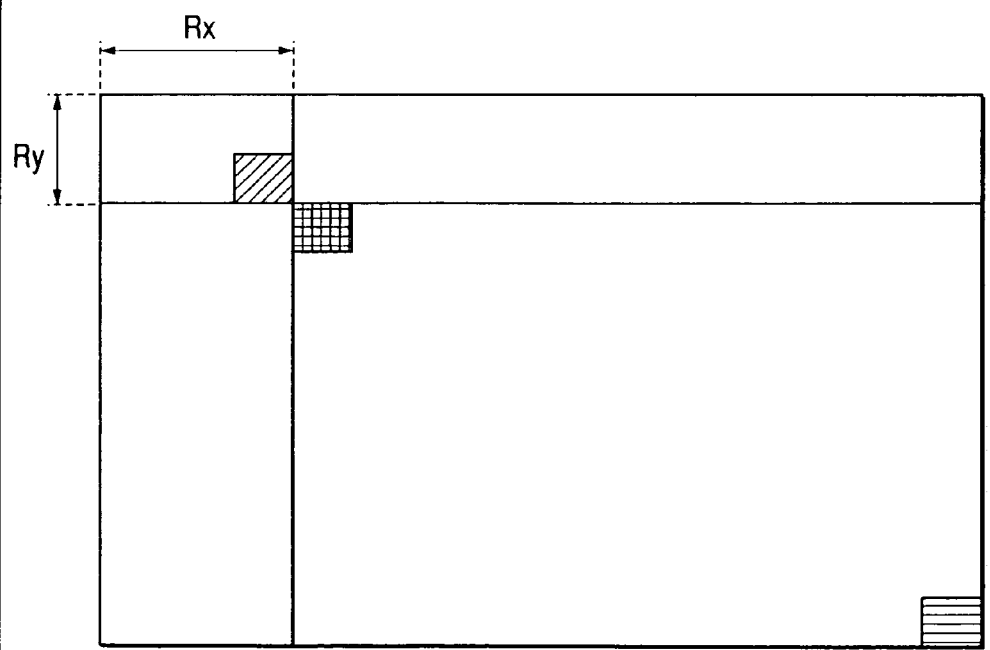
ROTATED IMAGE $I_{nml}$
 C1 COLOR PATCH    C2 COLOR PATCH    C3 COLOR PATCH

1ST PATCH IMAGE

- AREA Aua WHERE BLOCKS ARE ARRANGED OVER ALL PAGES
- AREA Ac WHERE CORRELATION WITH CONCERNED BLOCKS ALREADY ARRANGED IS HIGH
- AREA Aup WHERE BLOCKS ARE ARRANGED ON PART OF PAGES

- ARRANGEABLE AREA Aa

- AREA Au WHERE BLOCKS HAVE BEEN ALREADY ARRANGED OVER ALL PAGES
- AREA Ac WHERE CORRELATION WITH CONCERNED BLOCKS ALREADY ARRANGED IS HIGH

- ARRANGEMENT CANDIDATE AREA Ae

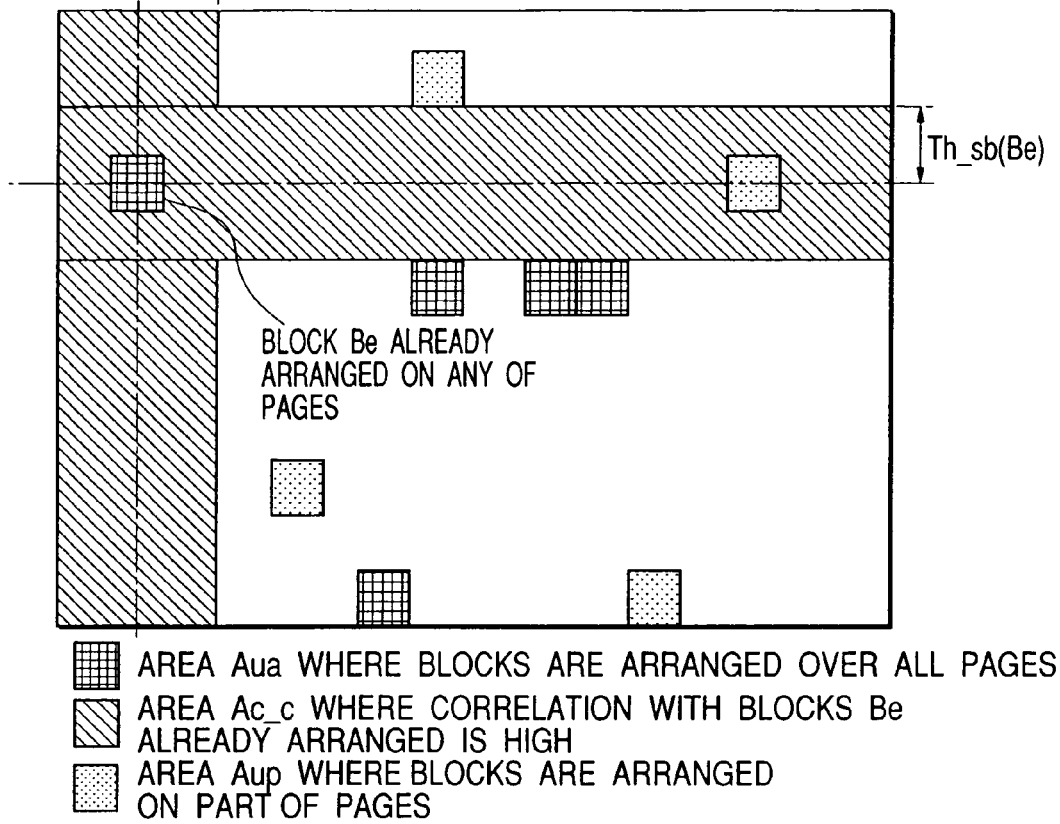
FIG. 24
▦ AREA Aua WHERE BLOCKS ARE ARRANGED OVER ALL PAGES
◨ AREA Ac_c WHERE CORRELATION WITH BLOCKS Be ALREADY ARRANGED IS HIGH
▨ AREA Aup WHERE BLOCKS ARE ARRANGED ON PART OF PAGES
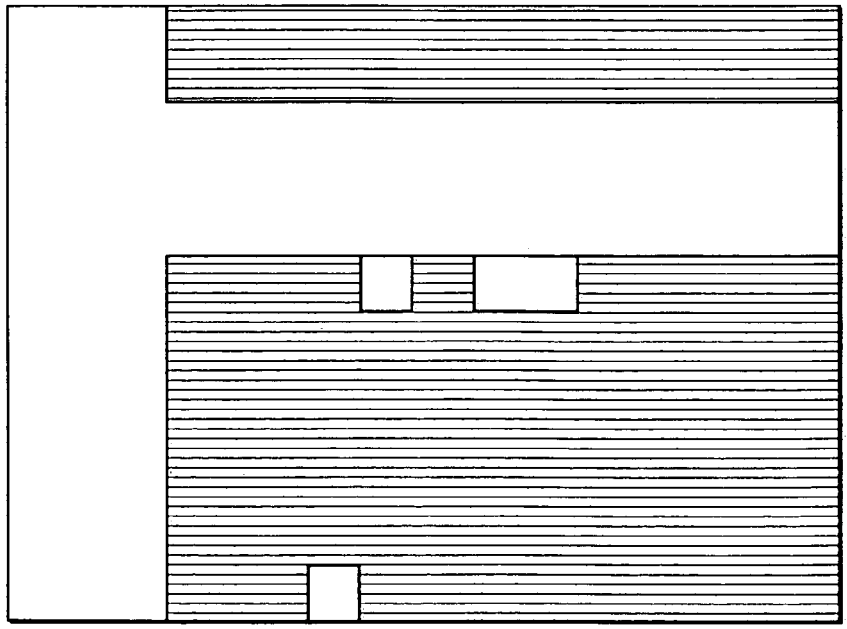
FIG. 25
 REARRANGEABLE AREA Ac_a

PATCH IMAGE PREPARATION METHOD AND RECORDING MEDIUM THEREFOR

BACKGROUND OF THE INVENTION

1. Field of the Invention

The present invention relates to the preparation of a patch image.

2. Related Background Art

The color DTP is recently becoming popular with a computer system, as a result of recent advances in the color reproducing ability of the computer and in the performance of the color printers. In such field there are employed a calibration technology for the color printer for the purpose of realizing exact color reproduction and the preparation of a printer model for the color printer for the purpose of realizing more exact color matching, but either technology involves such steps as preparation of a patch image, output of the prepared patch image and measurement of the outputted patch image. However, exact measurement of the patch image is impossible because a noise is always involved in the output of the patch image. Therefore, assuming that the noise is white noise, the influence of noise is relaxed by outputting and measuring the same patch image plural times. Otherwise the influence of the noise is relaxed by outputting the patch image with a rotation process plural times and measuring such patch image.

It is however not reasonable to assume that the noise color signal (hereinafter called noise) mixed in the patch image is white noise, since such noise is strongly correlated with the color of the patch. Consequently, the relaxation of the influence of noise is inevitably limited even if the same image is outputted many times. It is therefore necessary to prepare a patch image in consideration of the correlation of the noise. Also in consideration of the convenience in practical use, the number of the patch images should be as small as possible. There is thus required a patch image preparing method capable of relaxing the influence of noise taking the correlation of the noise into consideration and utilizing the patch images of a number as small as possible.

SUMMARY OF THE INVENTION

In consideration of the foregoing, the object of the present invention is to relax the influence of noise, taking the correlation of the noise in consideration and utilizing the patch images of a number as small as possible.

For attaining the above-mentioned object, the present invention is featured by the following constituent factors.

According to a first invention of the present application, there is provided a patch image preparation method for preparing a patch image to be used for generating image processing data, wherein the patch image includes plural patches relating to a same color, and the plural patches of the same color are so arranged as to decrease the mutual influence of the noise color signals resulting from the self correlation of the noise color signal in the plural patches of the same color.

According to a second invention of the present application, there is provided a patch image preparation method for preparing a patch image including plural patches of a same color to be used for generating image processing data, wherein the plural patches of the same color are so arranged as to decrease the mutual influence of the noise color signals resulting from the self correlation of the noise color signal in the plural patches of the same color.

According to a third invention of the present application, there is provided a patch image preparation method for preparing a patch image including plural patches of a same color, wherein, for each patch color, the patches are so arranged as to decrease the mutual influence of the noise color signals resulting from the self correlation of the noise color signal in the patch color in such a manner that the noise color signal in the patch color can be equivalently approximated by white noise.

According to a fourth invention of the present application, there is provided a method of preparing a basic patch image for a color to be used as a patch, preparing a rotated image by applying a rotation operation to the basic patch image and arranging the rotated image at an appropriate image position.

Other objects of the present invention, and the features thereof, will become fully apparent from the following detailed description which is to be taken in conjunction with the accompanying drawings.

BRIEF DESCRIPTION OF THE DRAWINGS

FIG. 16 is a view showing a basic patch image and a rotated image in the third embodiment;

FIG. 24 is a view showing an example of the arrangement non-permission area for a rearranged patch in the fourth embodiment; and FIG. 25 is a view showing an example of the arrangeable area for a rearranged patch in the first embodiment.

DETAILED DESCRIPTION OF THE PREFERRED EMBODIMENTS

In the following there will be explained, with reference to the accompanying drawings, embodiments of system configurations of a patch image output/measurement apparatus.

Such patch image output/measurement apparatus is used for preparing a printer model of a color printer, or generation of image processing data such as calibration of the color correcting condition.

The calibration is to cause the color printer to output a desired test patch, to measure the color of the outputted test patch, to judge the current color reproducing characteristics of the color printer from the result of such color measurement, and to optimize the color correcting condition.

Therefore, in case of applying the following embodiments to the calibration, the application is made in outputting the desired test patch.

First Embodiment

Figure 1:
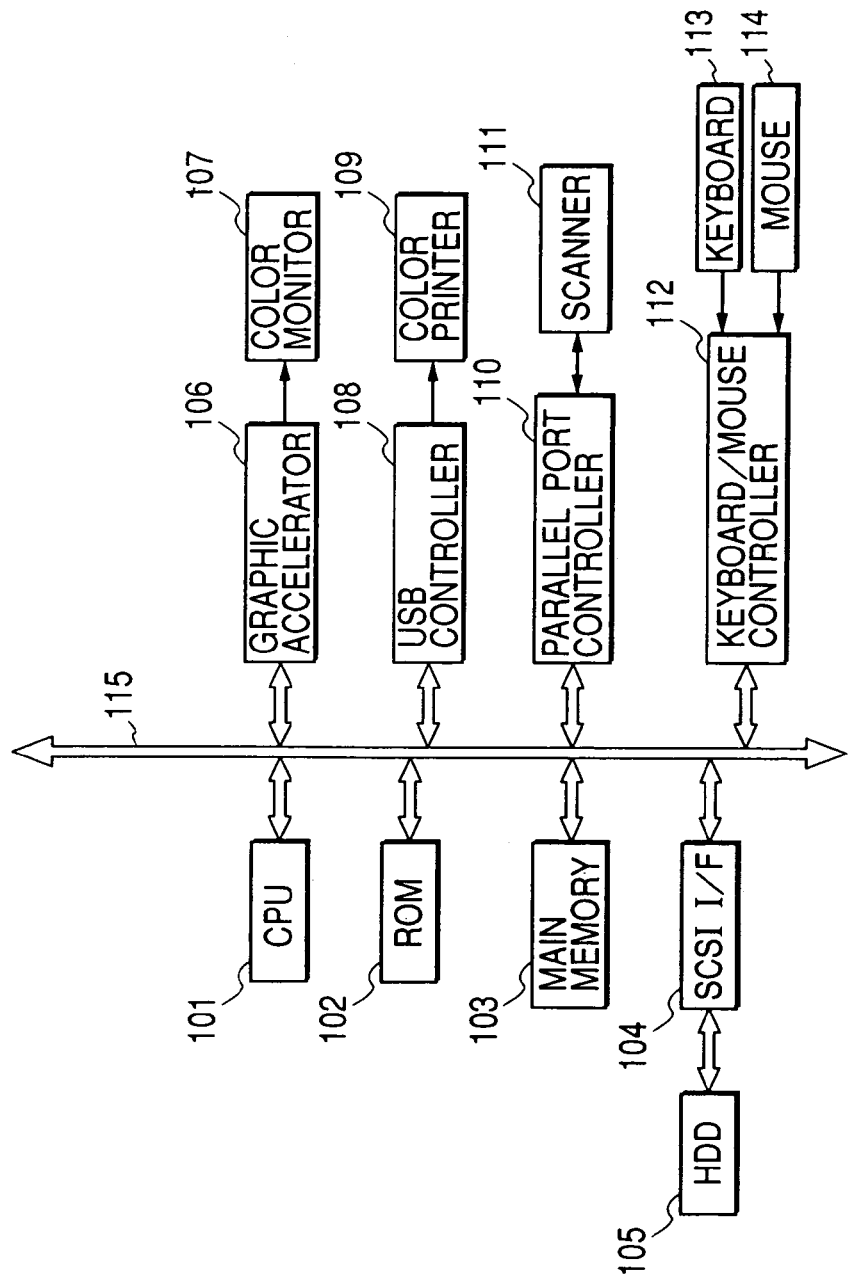
FIG. 1 is a block diagram showing the system configuration of a patch image output/measuring apparatus in a first embodiment.

FIG. 1 is a block diagram showing the configuration of a patch image output/measurement apparatus constituting a first embodiment of the present invention, wherein provided are a CPU 101, a ROM 102, a main memory 103, a SCSI interface 104, an HDD 105, a graphic accelerator 106, a color monitor 107, a USB controller 108, a color printer 109, a parallel port controller 110, a scanner 111, a keyboard/mouse controller 112, a keyboard 113, a mouse 114, and a PCI but 115. The CPU 101 executes various processings to be explained later according to program/data held in the ROM 102 and the HDD 105.

In the above-described configuration, when the user instructs the CPU 101 through the keyboard 113 and the mouse 110 to output a patch, the CPU 101 reads a patch preparation program from the HDD 105 and prepares at least a patch image according to the algorithm, to be explained later, stored in the patch preparation program. The prepared patch image is stored in the main memory 103. On the other hand, the order of color arrangement in the patch image is stored in the HDD 105. Thereafter the CPU transfers the patch image, stored in the main memory 103, to the printer 109 through the PCI bus 115 and the USB controller 108 and instructs the output in a designated mode. According to such instruction, the printer 109 outputs the patch image. Then the user sets the outputted patch print on the scanner 111 in a predetermined direction of sheet, and instructs the CPU 101 through the keyboard 113 and the mouse 114 to execute the patch measurement. According to the instruction, the CPU 101 instructs the scanner 111, through the PCI bus 115 and the parallel port controller 110, to execute scanning of the patch image. The image scanned according to the instruction is transferred from the scanner 111 to the main memory 103 through the parallel port controller and the PCI bus. When the transfer of the scanned image to the main memory 103 is completed, the CPU 101 executes image processing on the scanned image in the main memory 103, thereby detecting each patch and acquiring the color signal information, and stores the color signal information of the patch, obtained as the result, in the HDD 105. After these operations, the CPU 101 reads the patch color signal information and the color arrangement order of the patch image from the HDD 105, then executes information processing on the color signal information according to an algorithm instructed by the program, and stores the result of the information processing as the result of patch color measurement in the HDD 105, whereupon the sequence is completed. The algorithm will be explained later.

The result of the information processing stored in the HDD 105 is used for the preparation of the printer model of the aforementioned color printer or for the calibration.

Figure 2:
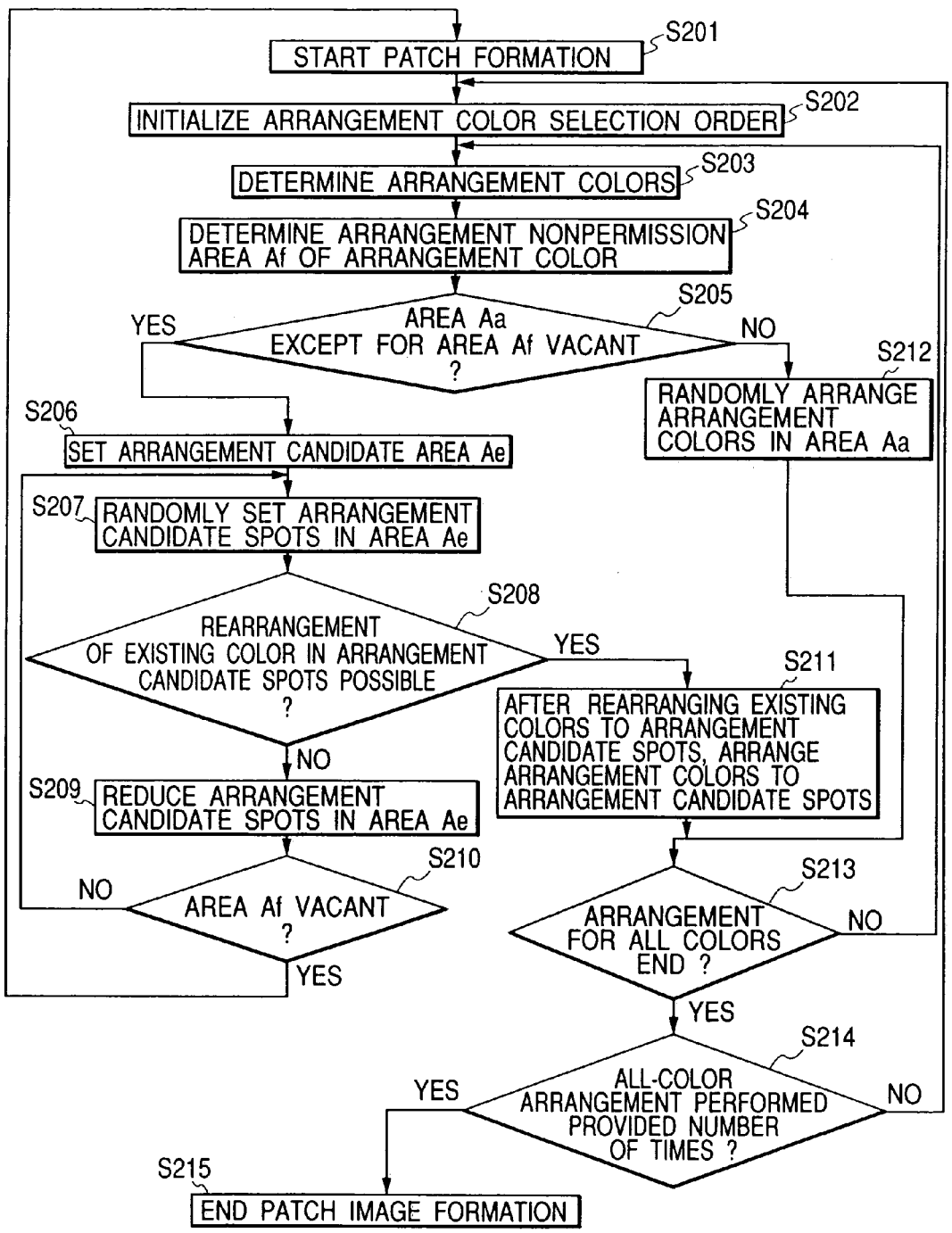
FIG. 2 is a flow chart showing the algorithm of a patch image preparation method of the first embodiment.

In the following there will be explained the patch preparation algorithm with reference to FIG. 2. The algorithm is principally composed of two loops. A loop proceeding from a step S203 to a step S212 and returning to the step S203 (hereinafter called a color arrangement loop) executes the color arrangement once for all the colors outputted as patches. A loop proceeding from a step S202 to a step S213 and returning to the step S202 (hereinafter called a main loop), including the aforementioned color arrangement loop, repeats the aforementioned color arrangement operation plural times, thereby preparing a patch image in which all the colors are outputted plural times. Each of the steps will be explained in the following.

A step S201 executes securing of a work memory area and initialization of work variables, for the patch preparation. The step S202 determines an order of arranging colors (hereinafter called color arrangement order) in random manner in the color arrangement loop. The step S203 determines colors to be arranged (arrangement colors) based on the color arrangement order determined in the step S202 and the number of repetition in the color arrangement loop.

The step S201 executes securing of a work memory area and initialization of work variables, for the patch preparation. The work variables include the kind of arrangement colors, the number of repetition of the color arrangement loop etc.

The kind of the arrangement colors and the number of repetition of the color arrangement loop may be designated by the user, utilizing a user interface of a software realizing the patch preparation algorithm of the present embodiment. An increase in the number of the prepared patches allows to execute the subsequent processes in a higher precision, but there increases the time required for the patch preparation and the color measurement.

Consequently, the designation of various conditions by the user allows to execute the patch formation according to the purpose of the user.

A step S204 determines an arrangement non-permission area Af corresponding to the concerned-color patch.

It was experimentally found that the noise has correlation in the main and sub scanning directions. In the following there will be explained, with reference to FIG. 3, a method for deriving the arrangement non-permission area Af based on such fact.

Figure 3:
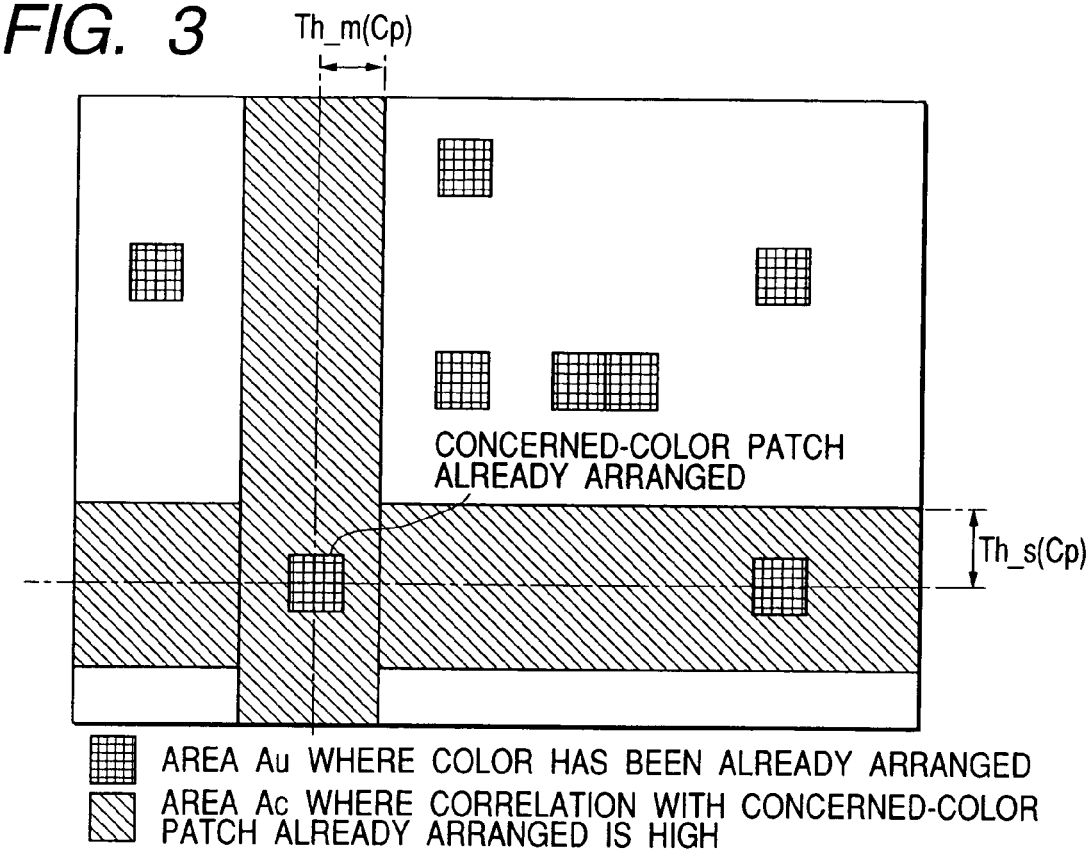
FIG. 3 is a view showing an example of the arrangement non-permission area in the first embodiment.

The arrangement non-permission area Af is determined as a sum of the following two areas respectively in the main scanning direction and in the sub scanning direction;

area 1: an area Au already with color arrangement, as indicated as a grid pattern area shown in FIG. 3; and area 2: an area Ac having a high correlation with the already arranged concerned-color patch at the arrangement of the concerned arrangement color Cp, as indicated by a hatched area in FIG. 3.

In FIG. 3, Th_m(Cp) and Th_s(Cp) respectively indicate a threshold value in the main scanning direction and a threshold value in the sub scanning direction, for a concerned-color calculated in advance. The method of deriving these threshold values will be explained later.

Figure 4:
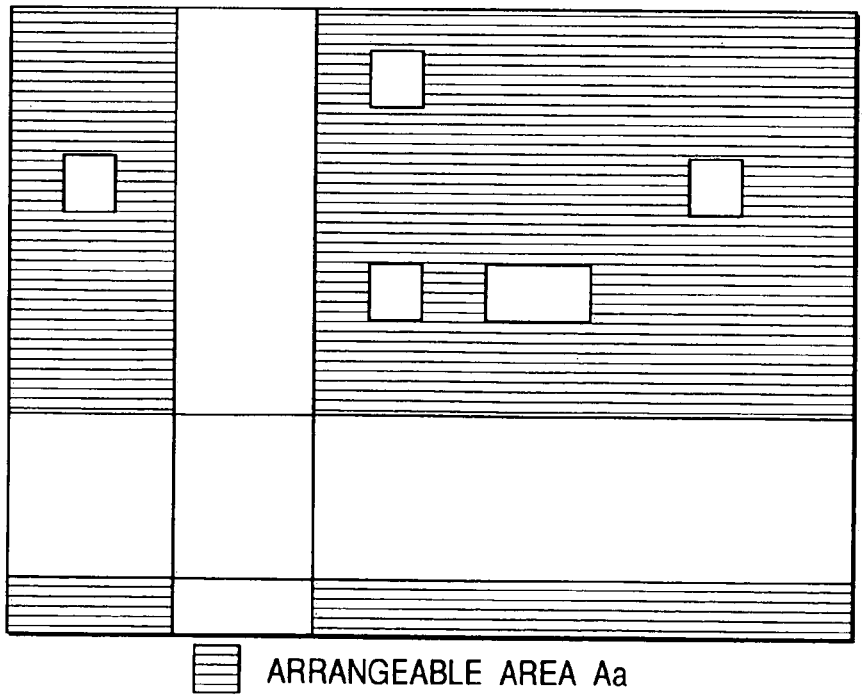
FIG. 4 is a view showing an example of the arrangeable area in the first embodiment.

A step S205 calculates an arrangeable area Aa, by eliminating the arrangement non-permission area Af from the entire patch arrangement area A. There are obtained the areas Au and Ac shown in FIG. 3, and FIG. 4 shows the arrangeable area Aa when the arrangement non-permission area Af is given from these two areas. The sequence jumps to a step S206 or the step S212 respectively if the area Aa is vacant or not.

Figure 5:
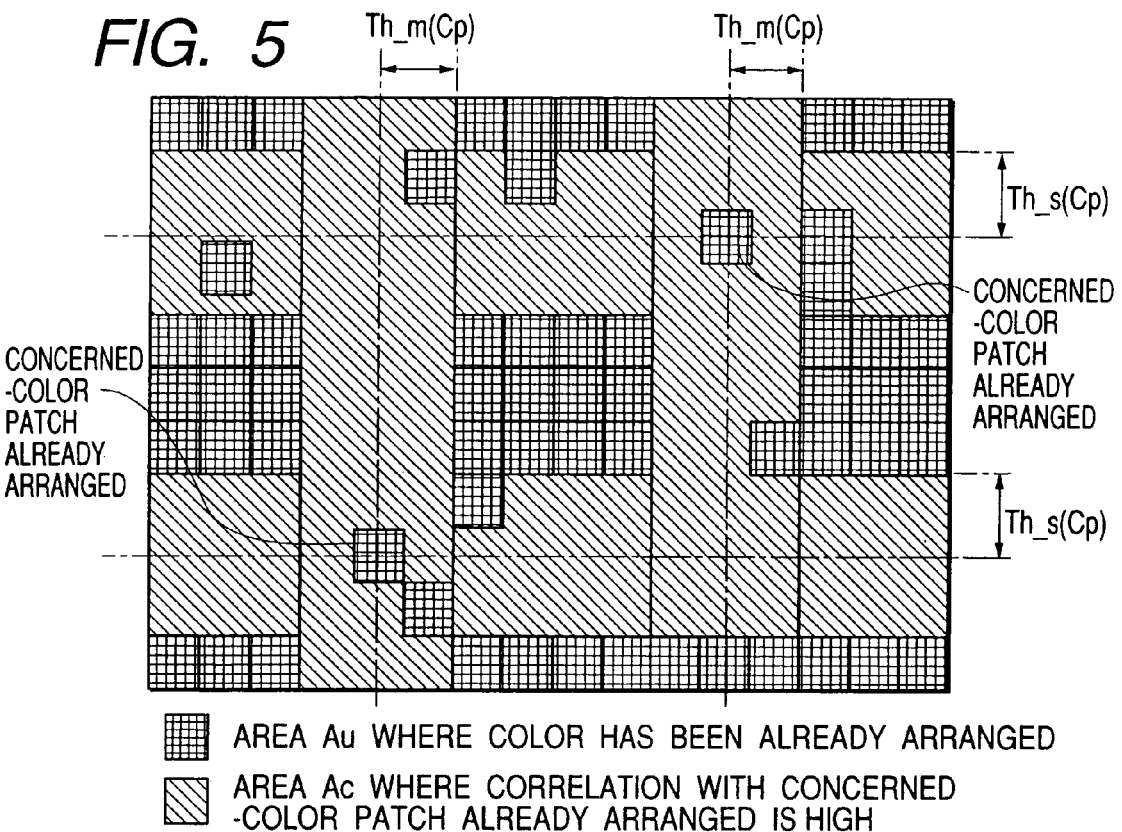
FIG. 5 is a view showing an example of the arrangement non-permission area in the first embodiment.
Figure 6:
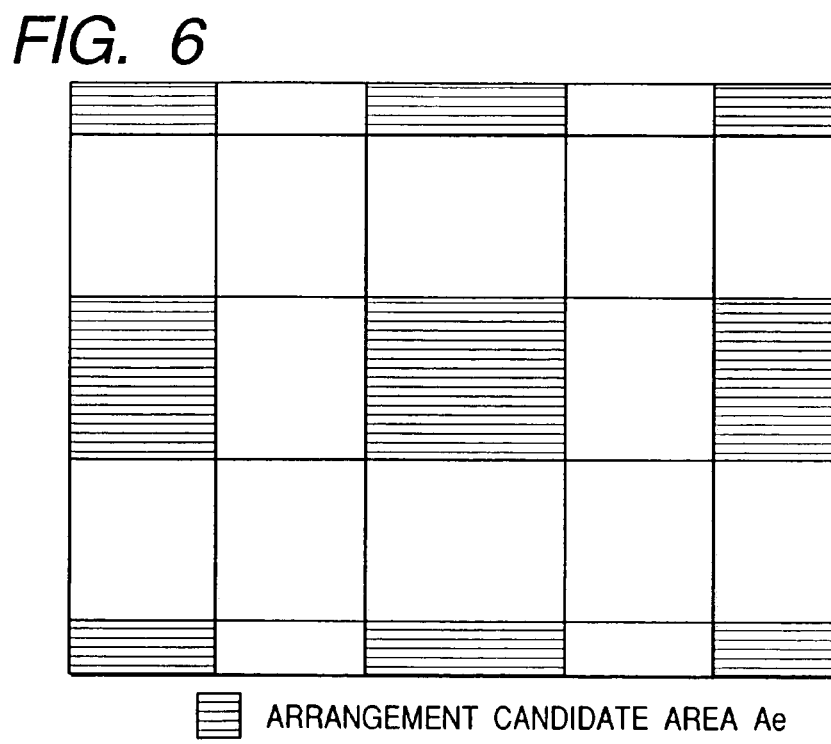
FIG. 6 is a view showing an example of the arrangement candidate area in the first embodiment.

The step S206 determines an arrangement candidate area Ae by reducing the area Ac form the area A. In case the area Ac becomes as shown in FIG. 5, the arrangement candidate area Ac becomes as shown in FIG. 6. A step S207 determines, in the arrangement candidate area Ae, an arrangement candidate spot for the concerned arrangement color in a random manner. A step S208 acquires the color Ce of a patch (hereinafter called rearrangement patch) already arranged in the arrangement candidate spot, and discriminates whether the acquired color Ce can be rearranged. Such discrimination will be explained with reference to FIGS. 7 and 8.

Figure 7:
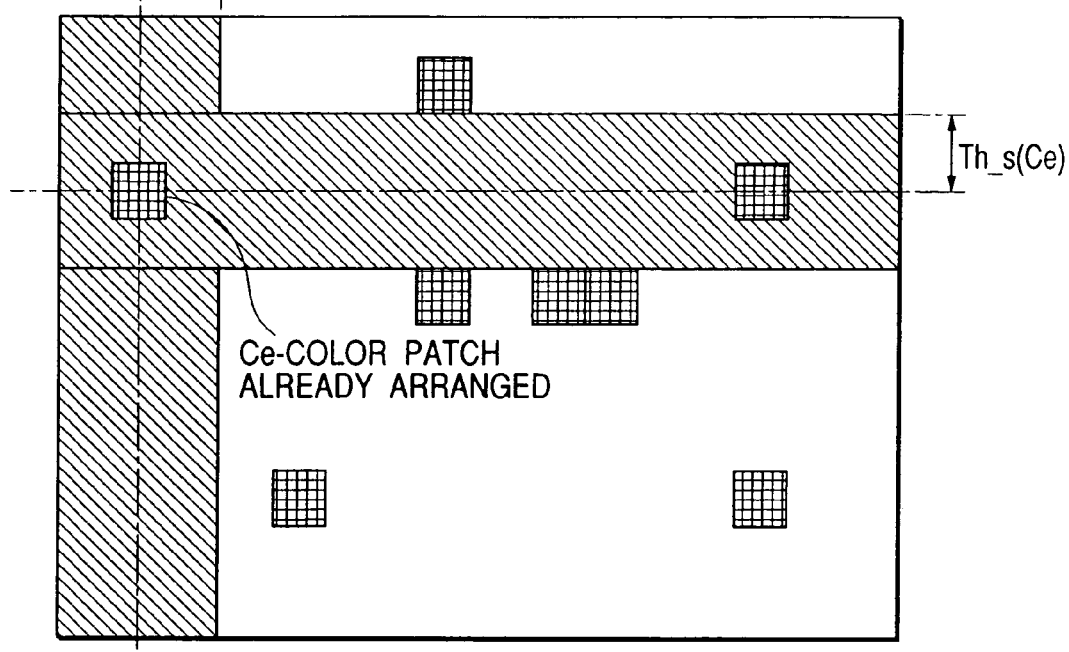
FIG. 7 is a view showing an example of the arrangement non-permission area for a rearranged patch in the first embodiment.
Figure 8:
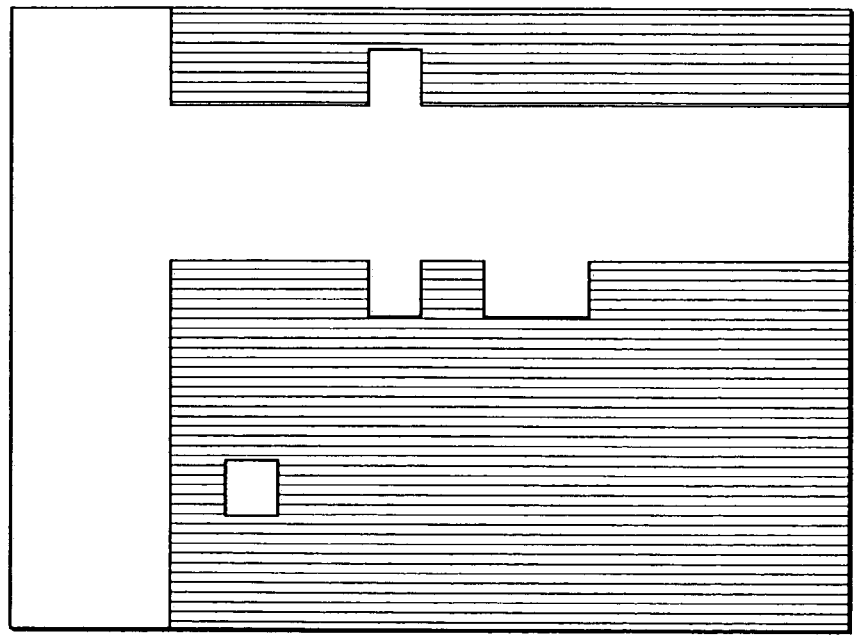
FIG. 8 is a view showing an example of the arrangeable area for a rearranged patch in the first embodiment.

There is calculated an area Ac_c, other than the arrangement candidate spot, having a high correlation with the already arranged color patch Ce. Then there is determined an area Ac_s as a sum of the above-mentioned area and the area Au in which the color is already arranged, and a rearrangeable area Ac_a is calculated by reducing the area Ac_s from the entire patch arrangement area A. For example, if the area Ac s is given as shown in FIG. 7, the rearrangeable area Ac_a is given as shown in FIG. 8. The rearrangement is judged impossible or possible respectively if the area Ac_a is vacant or not.

The sequence jumps to a step S211 or S208 respectively if the rearrangement is judged possible or impossible.

A step S209 reduces the arrangement candidate spot from the arrangement candidate area Ae. A step S210 discriminates that the patch preparation failed if the area Ae becomes vacant, whereupon the sequence jumps to the step S201.

If it is not vacant, the sequence jumps to the step S207. The step S211 rearranges the rearrangement patch randomly in the area Ac_a, and then arranges the concerned arrangement color in the arrangement candidate spot. Thereafter the sequence jumps to the step S213.

The step S212 randomly arranges the concerned arrangement color in the arrangeable area Aa, and the sequence jumps to the step S213. If the step S213 identifies that the patch arrangement is completed for all the colors used as the patches, the sequence proceeds to a step S214. If the step S214 identifies that the arrangement of all the color patches has been executed for a predetermined number of times, the sequence proceeds to a step S215, but, if such predetermined number has not been reached, the sequence proceeds to the step S202. The step S215 completes the patch image preparation.

In the following there will be explained the method for deriving the threshold value Th_m in the main scanning direction and the threshold value Th_s in the sub scanning direction for each patch color. For each color, the threshold value Th_m is determined from the correlation between the noise and the main scanning direction and from the dispersion of the noise, and the threshold value Th_s is determined from the correlation between the noise and the sub scanning direction and from the dispersion of the noise.

In calculating the threshold value Th_m, there is at first calculated the correlation function fm(x) between the noise and the main scanning direction in the following manner:

$$fm(x) = \frac{1}{Rm} \int \int n(s, t)(s + x, t) ds dt$$

wherein n(s, t) indicates the noise signal at a position s in the x-direction and a position t in the y-direction, and Rm is a normalizing constant.

Then the correlation function fm(x) is normalized in the following manner by the noise dispersion v, thereby obtaining a function fmn(x):

$$fmn(x) = fm(x)v$$

Figure 9:
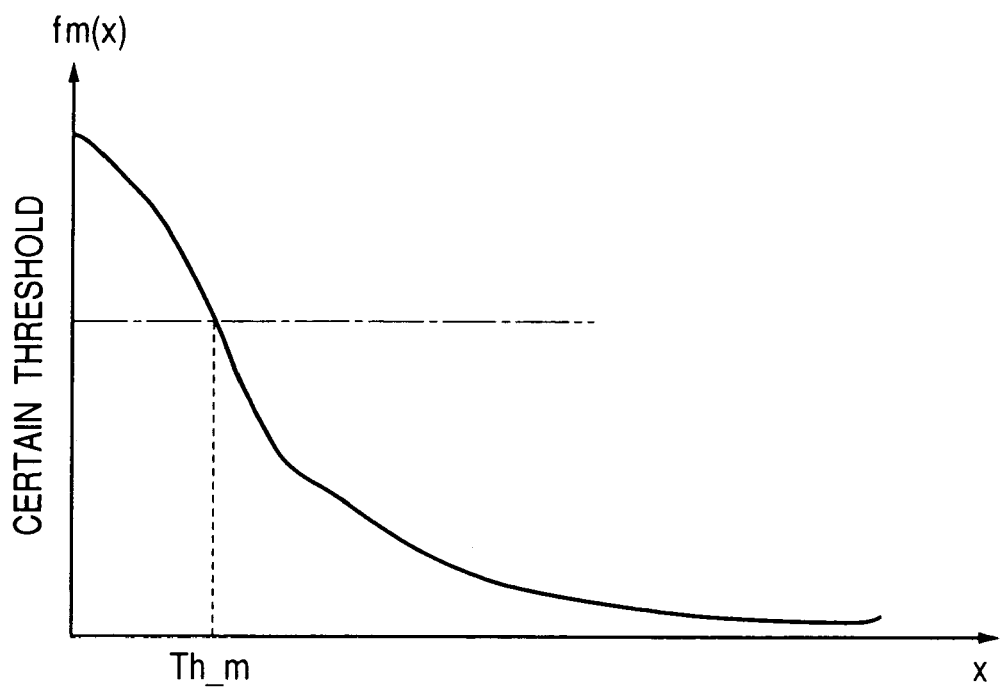
FIG. 9 is a chart schematically showing a self correlation function, in the main scanning direction, of the noise color signal mixed in a color, and showing the relationship between a certain threshold value and a threshold value Th_m in the main scanning direction.

Then there is determined a value x for which the function fmn(x) becomes lower than a certain threshold value, and such value x is defined as the threshold value Th_m. This relationship is shown in FIG. 9. In the present embodiment, the above-mentioned threshold value is experimentally determined in advance.

Then, for calculating the threshold value Th_s, there is at first calculated the correlation function fs(y) between the noise and the sub scanning direction in the following manner:

$$fs(y) = \frac{1}{Rs} \int \int n(s, t)(s + t, y) ds dt$$

wherein Rs is a normalizing constant.

Then the correlation function fs(y) is normalized in the following manner by the noise dispersion v, thereby obtaining a function fsn(x):

$$fsn(x) = fs(x)v$$

Figure 10:
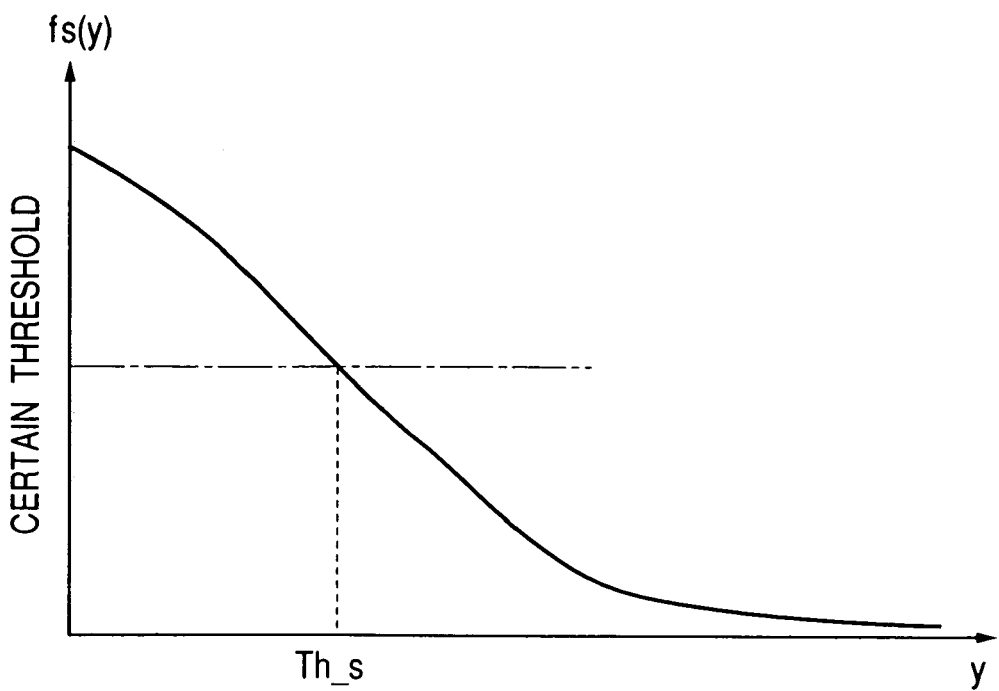
FIG. 10 is a chart schematically showing a self correlation function, in the sub scanning direction, of the noise color signal mixed in a color, and showing the relationship between a certain threshold value and a threshold value Th_s in the sub scanning direction.

Then there is determined a value y for which the function fsn(y) becomes lower than a certain threshold value, and such value y is defined as the threshold value Th_s. This relationship is shown in FIG. 10.

In the following there will be explained the algorithm of information processing on the patch color signal information. In the patch image formation, by outputting the patch images through image formation utilizing the patch n times for each color, the patch color signal information representing the measurement of such patch images can be obtained in n samples for each color. The result c(C) of the information processing can be obtained by the following averaging calculation:

$$c(C) = \frac{1}{n} \sum_i s(C, i)$$

wherein s(C, i) is the patch color signal information of an i-th sample for a color C.

Such result c(C) of the information processing is defined as the result of patch color measurement.

The present embodiment allows, by patch arrangement in consideration of the self correlation of the noise for each patch color in the patch image preparation, to relax the influence of noise in the patch measurement thereby improving the efficiency and the accuracy.

Second Embodiment

The present embodiment modifies the algorithm of patch preparation in the first embodiment, thereby enabling preparation of plural patch images. In the following there will be explained the patch preparation algorithm alone with reference to FIG. 2.

The step S201 executes securing of a work memory area and initialization of work variables, for the patch preparation. The step S202 randomly determines the order of arranging colors (hereinafter called color arrangement order) in the color arrangement loop.

The step S203 determines a color Cp to be arranged (arrangement color) from the color arrangement order determined in the step S202 and the number of repetition in the color arrangement loop.

Figure 11:
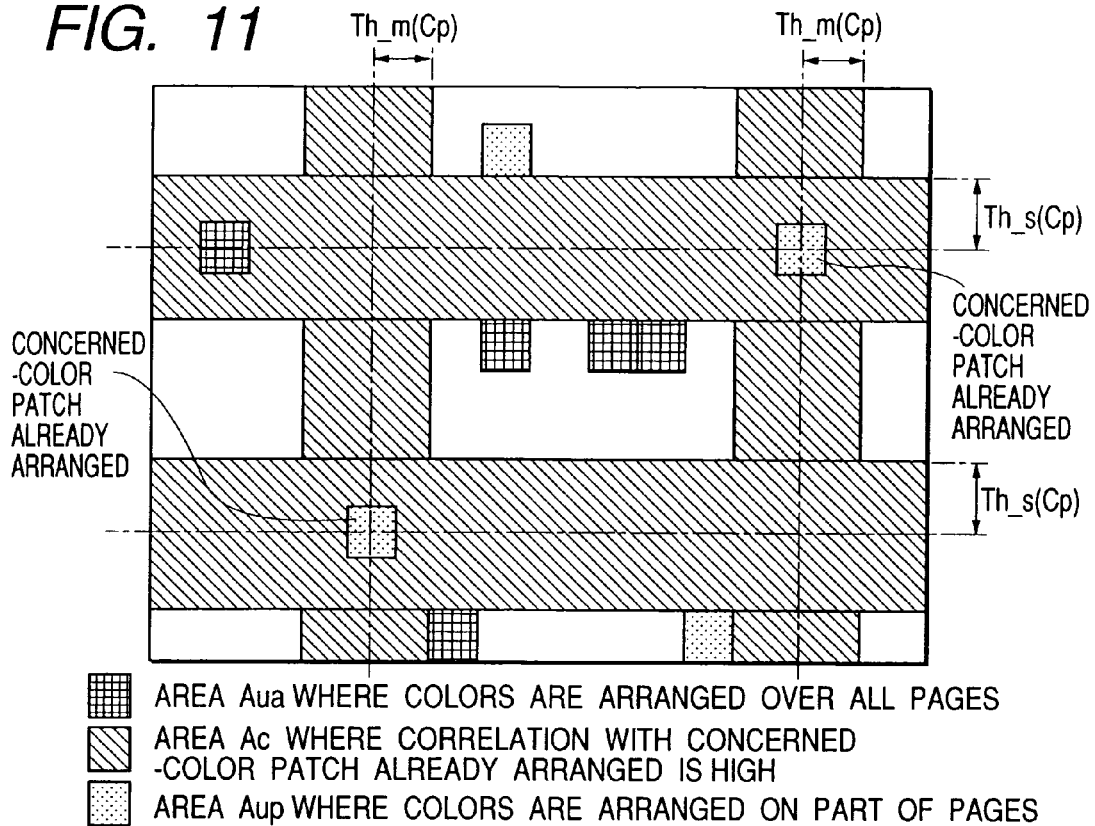
FIG. 11 is a view showing an example of the arrangement non-permission area in a second embodiment.

The step S204 determines an arrangement non-permission area for the concerned arrangement color Cp. The deriving method for the arrangement non-permission area Af will be explained with reference to FIG. 11. The arrangement non-permission area Af is determined as a sum of the following two areas:

area 1: an area Aua already with color arrangement over all the pages, as indicated as a grid pattern area in FIG. 11; and area 2: an area Ac having a high correlation with the already arranged concerned-color patch at the arrangement of the concerned arrangement color Cp, as indicated by a hatched area in FIG. 11.

Figure 20:
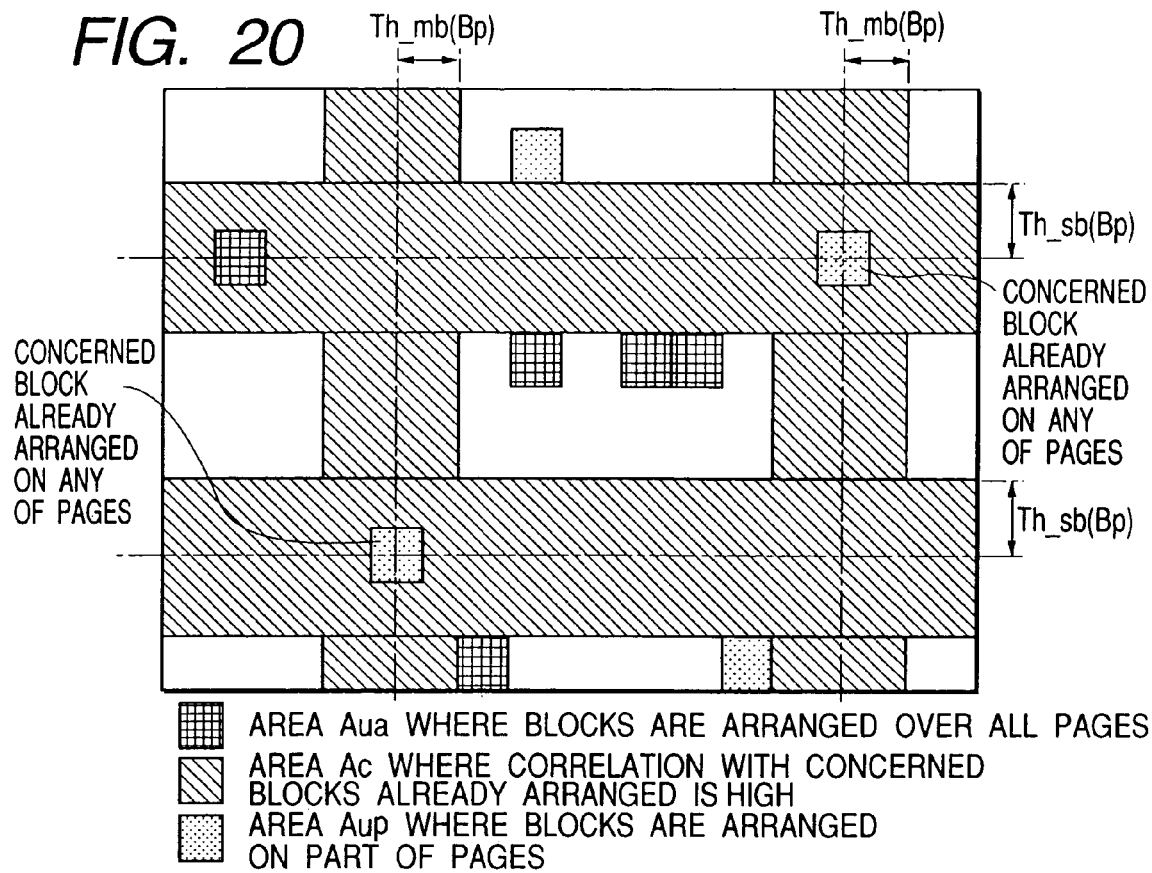
FIG. 20 is a view showing an example of the arrangement non-permission area in the fourth embodiment.

The following area is not included in the arrangement non-permission area Af, since, if a patch is arranged in a certain page, the arrangement is possible in the same area in another page:

area 3: an area Aup in which the block is arranged in a part of the pages, as indicated by a dotted area in FIG. 20.

In FIG. 11, Th_m(Cp) and Th_s(Cp) respectively indicate a threshold value in the main scanning direction and a threshold value in the sub scanning direction, for a concerned color, calculated in advance. The method of deriving these threshold values will be explained later.

Figure 12:
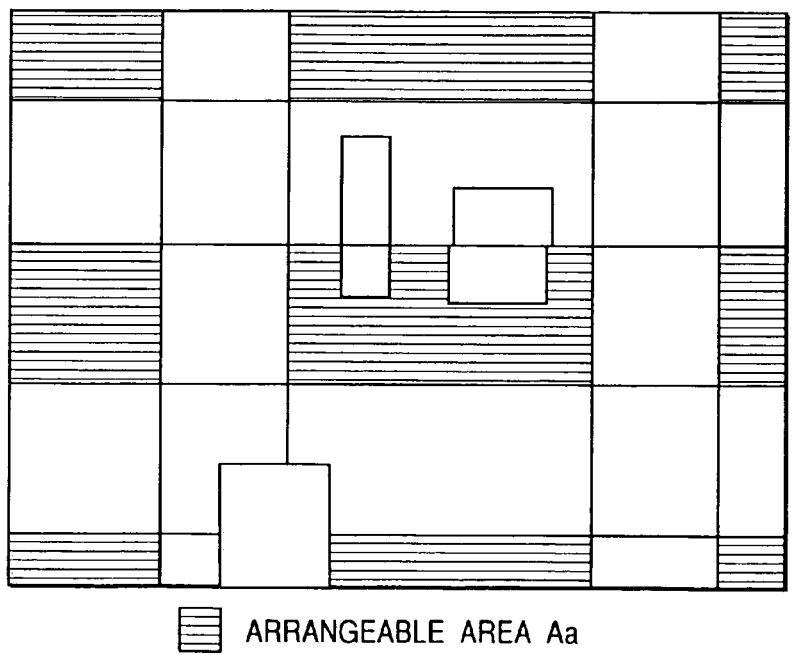
FIG. 12 is a view showing an example of the arrangement candidate area in the second embodiment.

The step S205 calculates an arrangeable area Aa, by reducing the arrangement non-permission area Af from the entire patch arrangement area A. FIG. 12 shows the arrangeable area Aa for the arrangement non-permission area shown in FIG. 11. The sequence proceeds to the step S206 or the step S212 respectively if the area Aa is vacant or not.

The step S206 determines an arrangement candidate area Ae by reducing the area Ac from the area A. The step S207 randomly determines, in the arrangement candidate area Ae, an arrangement candidate page and a arrangement candidate spot for the concerned arrangement color.

The step S208 acquires the color Ce of a patch (hereinafter called rearrangement patch) already arranged in the arrangement candidate page and the arrangement candidate spot, and discriminates whether the acquired color Ce can be rearranged. Such discrimination will be explained with reference to FIGS. 13 and 14.

Figure 13:
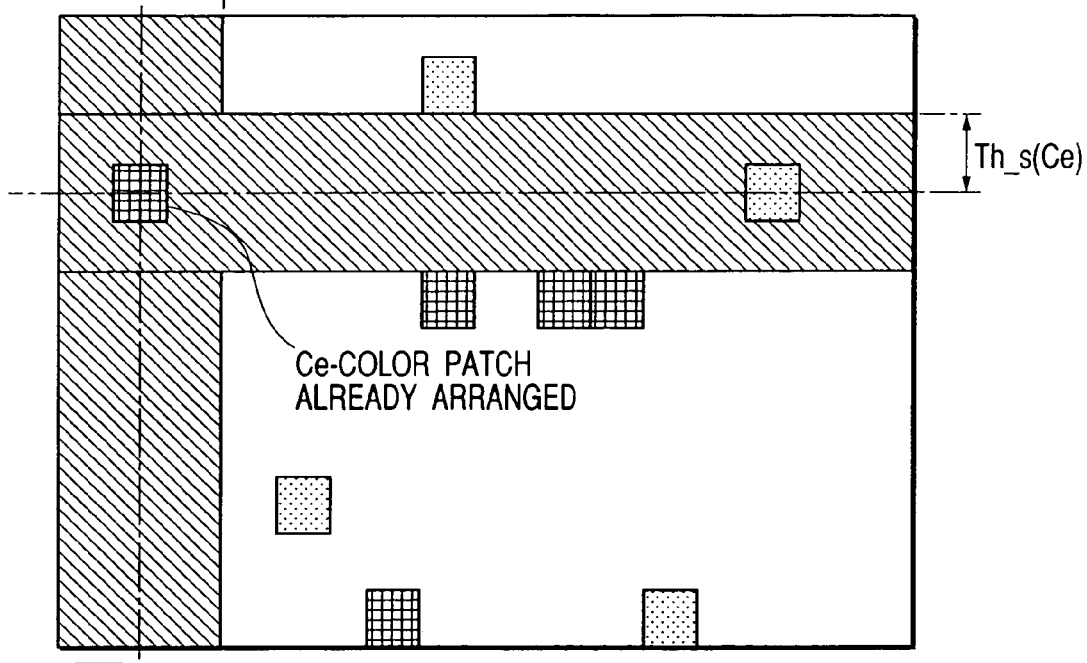
FIG. 13 is a view showing an example of the arrangement non-permission area for a rearranged patch in the second embodiment.
Figure 14:
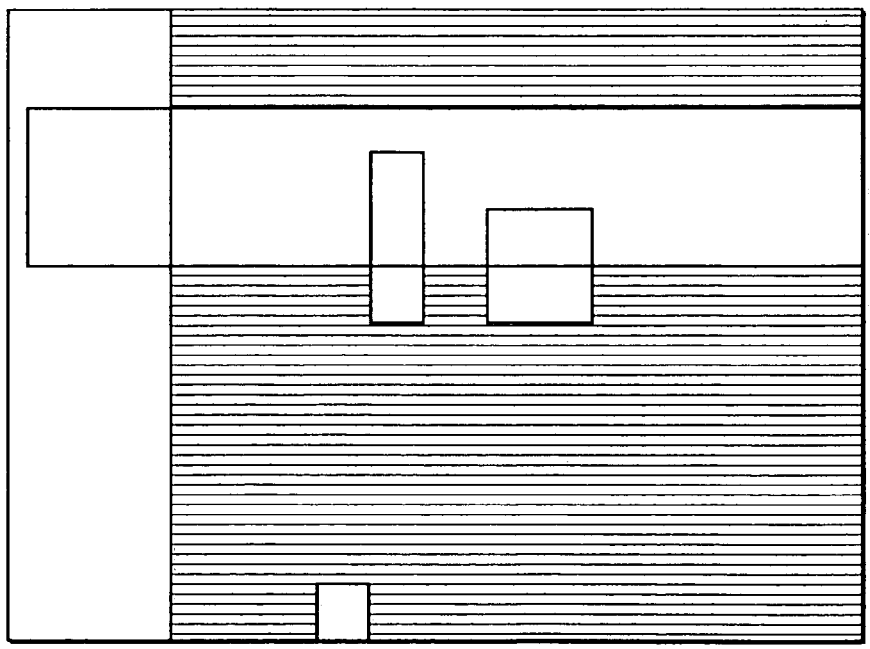
FIG. 14 is a view showing an example of the arrangeable area for a rearranged patch in the second embodiment.

There is calculated an area Ac_c, other than the arrangement candidate spot, having a high correlation with the already arranged color patch Ce. Then there is determined an area Ac_s as a sum of the above-mentioned area and the area Aus in which the color is already arranged over all the pages, and a rearrangeable area Ac_a is calculated by reducing the area Ac_s from the entire patch arrangement area A. For example, if the area Ac_s is given as shown in FIG. 13, the rearrangeable area Ac_a is given as shown in FIG. 14. The rearrangement is judged impossible or possible respectively if the area Ac_a is vacant or not.

The sequence proceeds to the step S211 or S208 respectively if the rearrangement is judged possible or impossible. The step S209 reduces the arrangement candidate spot from the arrangement candidate area Ae. The step S210 discriminates that the patch preparation failed if the area Ae becomes vacant, whereupon the sequence proceeds to the step S201. If it is not vacant, the sequence proceeds to the step S207. The step S211 rearranges the rearrangement patch Ce randomly n the area Ac_a, and also randomly determines the page of arrangement, excluding the page in which the color is already arranged in the arrangement spot. Thereafter the concerned arrangement color is arranged in the arrangement candidate spot, and the sequence proceeds to the step S213.

The step S212 randomly arranges the concerned arrangement color in the arrangeable area Aa, and also randomly determines the arrangement page, excluding the page in which the color is already arranged in the arrangement spot. Thereafter the sequence proceeds to the step S213.

If the step S213 identifies that the patch arrangement is completed for all the colors used as the patches, the sequence proceeds to the step S214, but, if the arrangement is not complete, the sequence proceeds to the step S203. If the step S214 identifies that the arrangement of all the color patches has been executed for a predetermined number of times, the sequence proceeds to the step S215, but, if such predetermined number has not been reached, the sequence proceeds to the step S203. The step S215 completes the patch image preparation.

The present embodiment allows to improve the accuracy in comparison with the first embodiment, by preparing plural patch images.

Third Embodiment

The present embodiment provides a modification of the patch preparation algorithm of the first embodiment. In the following there will therefore be explained the patch preparation algorithm only with reference to FIG. 15.

Figure 15:
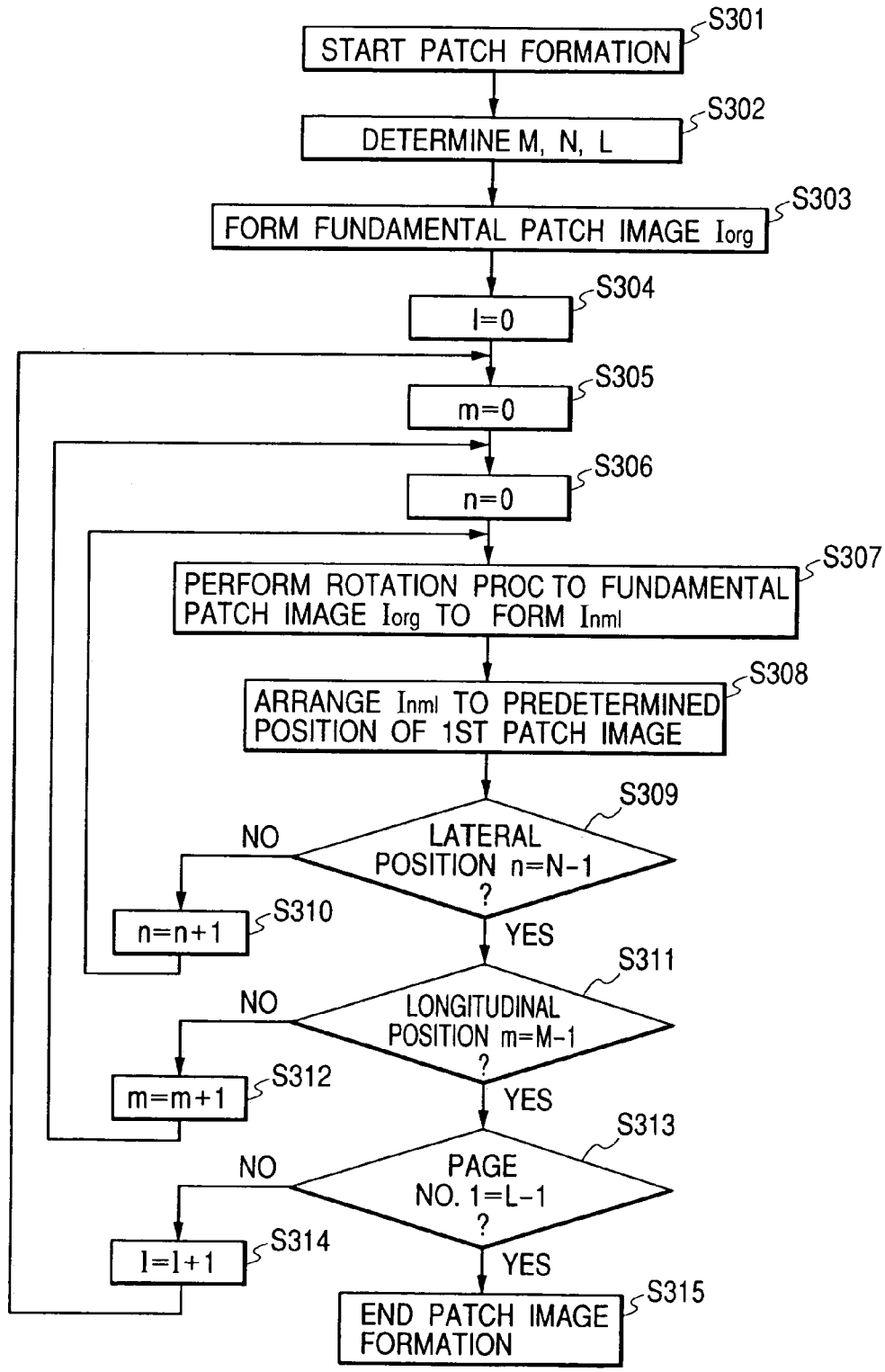
FIG. 15 is a flow chart showing the algorithm of a patch image preparation method of a third embodiment.
Figure 17:
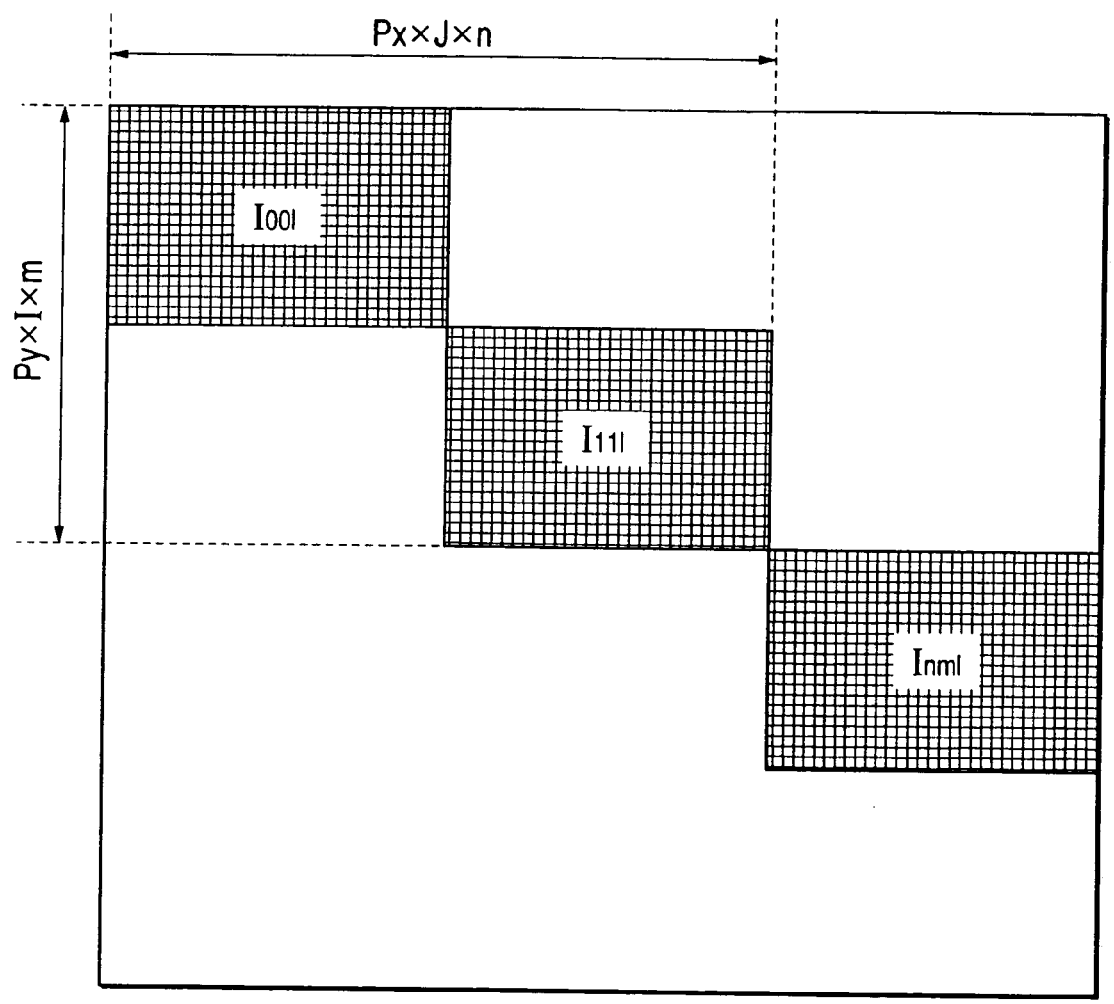
FIG. 17 is a view showing the arrangement spot of the rotated image in the third embodiment.

The algorithm shown in FIG. 15 is principally composed of two loops. A loop proceeding from a step S305 to a step S311 and returning to a step S306 (hereinafter called a color arrangement loop) executes preparation of a patch image by arranging one or plural images obtained by a rotating process (hereinafter called rotated image) on the basic patch image. A loop proceeding from a step S304 to a step S313 and returning to the step S305 (hereinafter called a main loop), including the aforementioned color arrangement loop, executes the aforementioned color arrangement operation plural times or once, thereby preparing plural or one patch image. Each of the steps will be explained in the following.

A step S301 executes securing of a work memory area and initialization of work variables, for the patch preparation. A step S302 determines variables L, M and N, in which L indicates the number of the patch images. M and N determine the number of arrangement of the rotated images in a patch image, wherein M is the number of arrangement of the rotated images in the y-direction and N is the number of arrangement of the rotated images in the x-direction. Thus the number of arrangement of the rotated images in a patch image is given by M×N.

A step S303 prepares a basic patch image Iorg. The basic patch image Iorg have I patches in the y-direction and J patches in the x-direction, thus containing I×J patches in total. The size of the patch is selected as Px×Py. The step S304 sets l=0, then the step S305 sets m=0, and the step S306 sets n=0.

A step S307 executes a rotating operation on the basic patch image Iorg, thereby preparing a rotated image Inml. The rotation amount Rx in the x-direction and the rotation amount Ry in the y-direction are determined from l, m and n according to the following equations, in which parentheses [ ] indicates a function of discarding the fractional part and taking the integral part only:

$$Rx = Px \times \left[\frac{J}{LN}(lN+n)\right]$$

$$Ry = Py \times \left[\frac{I}{LM}(lM+m)\right]$$

FIG. 16 shows the relationship between the basic patch image and the rotated image Inml.

A step S308 arranges the rotated image Inml, obtained in the step S307, in a predetermined position. The upper left corner of the rotated image Inml is at a position displaced, from the upper left corner of the patch image, by Px×J×n to the right and by Py×I×m to below.

A step S309 discriminates whether the current value of n is equal to N−1, and, if equal, the sequence proceeds to the step S311, but, if not equal, the sequence proceeds to a step S310. The step S310 adds 1 to the current value of n and the sequence proceeds to the step S307. The step S311 discriminates whether the current value of m is equal to M−1, and, if equal, the sequence proceeds to the step S313, but, if not equal, the sequence proceeds to a step S312. The step S312 adds 1 to the current value of m and the sequence proceeds to the step S306. The step S313 discriminates whether the current value of l is equal to L−1, and, if equal, the sequence proceeds to a step S315, but, if not equal, the sequence proceeds to a step S314. The step S314 adds to the current value of l and the sequence proceeds to l the step S305. The step S315 completes the preparation of the patch image.

The present embodiment enables easy preparation of the patch image, and allows to relax the influence of noise on all the colors in average, by executing regular arrangement. Also as the relationship between the accuracy and the number of the patch images is made clear, it is made easier for the user to effect selection between the accuracy and the cumbersomeness. Also the arrangement order information can be significantly reduced by the use of regular arrangement.

Fourth Embodiment

The present embodiment provides a modification of the patch preparation algorithm of the first embodiment. In the following there will be explained such algorithm with reference to FIGS. 18 to 25.

The present embodiment is to prepare a block image containing plural patches and then to arrange such block image, thereby alleviating the load of calculation required for patch arrangement.

Figure 18:
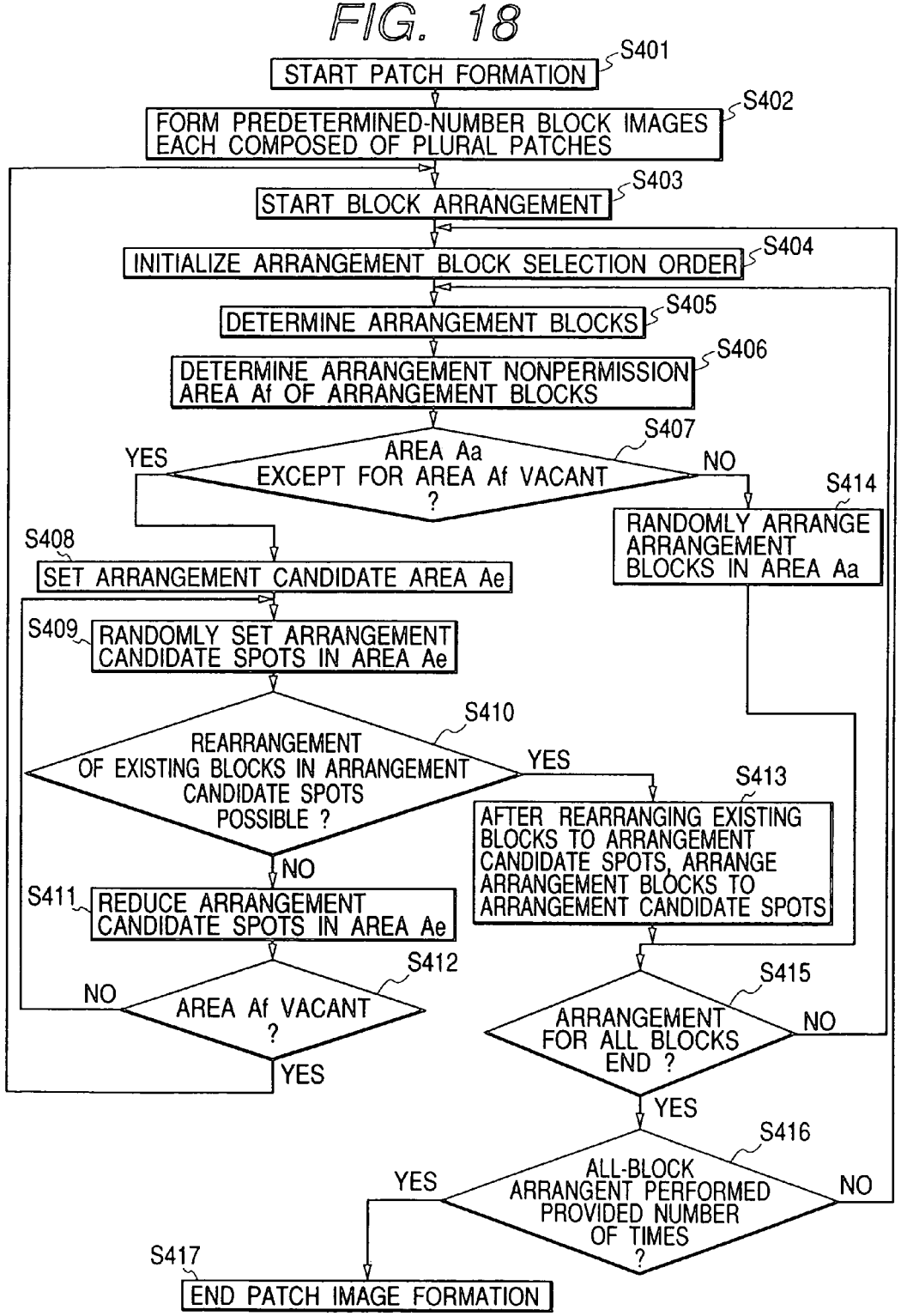
FIG. 18 is a flow chart showing the algorithm of a patch image preparation method of a fourth embodiment.

In the following there will be explained the patch preparation algorithm with reference to FIG. 18. The algorithm is principally composed of two loops. A loop proceeding from a step S404 to a step S415 and returning to the step S404 (hereinafter called an arrangement loop) executes the color arrangement once for all the blocks. A loop proceeding from a step S403 to a step S416 and returning to the step S403 (hereinafter called a main loop), including the aforementioned color arrangement loop, repeats the aforementioned arrangement operation plural times, thereby preparing patch images on plural pages, in which all the blocks are outputted plural times. Each of the steps will be explained in the following.

A step S401 executes securing of a work memory area and initialization of work variables, for the patch preparation.

Figure 19:
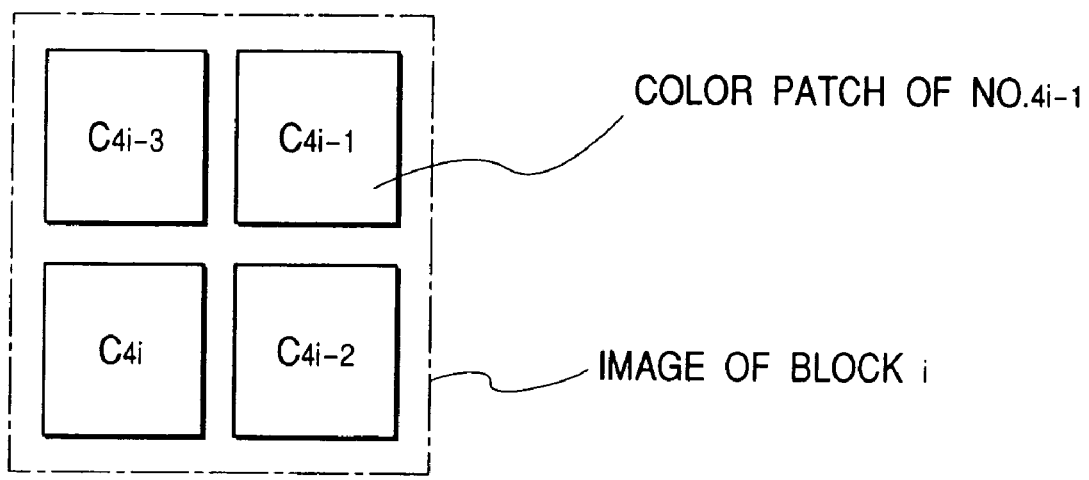
FIG. 19 is a view showing the arrangement of patches in a block image in the fourth embodiment.

A step S402 prepares a block image (hereinafter called a block), containing plural patches, in such a manner that the product set of arbitrary blocks is vacant and that the sum set of all the blocks becomes the set of all the patches. As an example, there will be explained the block preparation rule in case of preparing patches of 1000 colors. At first patch numbers 1–1000 are assigned to the color patches. Then the image of each block is formed by assigning patch numbers 4$i$-3, 4$i$-2, 4$i$-1 and 4$i$ to the block of a number i as shown in FIG. 19. In this manner there are formed 250 blocks.

The step S403 executes securing of the work memory area and initialization of work variables, in preparation for the block arrangement.

The step S404 determines the order of block arrangement (block arrangement order) in the arrangement loop, in random manner.

A step S405 determines blocks Bp to be arranged (arrangement blocks) based on the block arrangement order determined in the step S404 and the number of repetition in the arrangement loop.

A step S406 determines an arrangement non-permission area corresponding to the concerned arrangement block Bp.

The method for deriving the arrangement non-permission area Af will be explained in the following. The arrangement non-permission area Af is determined as a sum of the following two areas:

area 1: an area Aua where the blocks are already arranged on all the pages, as indicated by a grid pattern area shown in FIG. 20; and area 2: an area Ac having a high correlation with the already arranged concerned block at the arrangement of the concerned arrangement block Bp, as indicated by a hatched area in FIG. 20.

The following area is not included in the arrangement non-permission area Af, since, if a block is arranged in a certain page, the arrangement is possible in the same area in another page:

area 3: an area Aup in which the block is arranged in a part of the pages, as indicated by a dotted area in FIG. 20.

In FIG. 20, Th_mb(Bp) and Th_sb(Bp) respectively indicate a threshold value in the main scanning direction and a threshold value in the sub scanning direction, for a concerned-block calculated in advance. The method for deriving these threshold values will be explained in the following.

Figure 21:
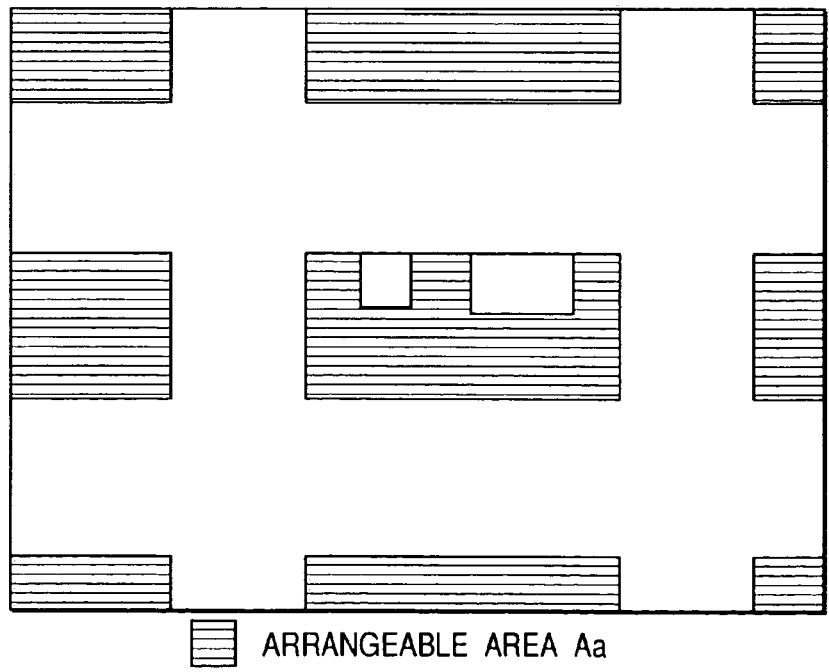
FIG. 21 is a view showing an example of the arrangeable area in the fourth embodiment.
Figure 22:
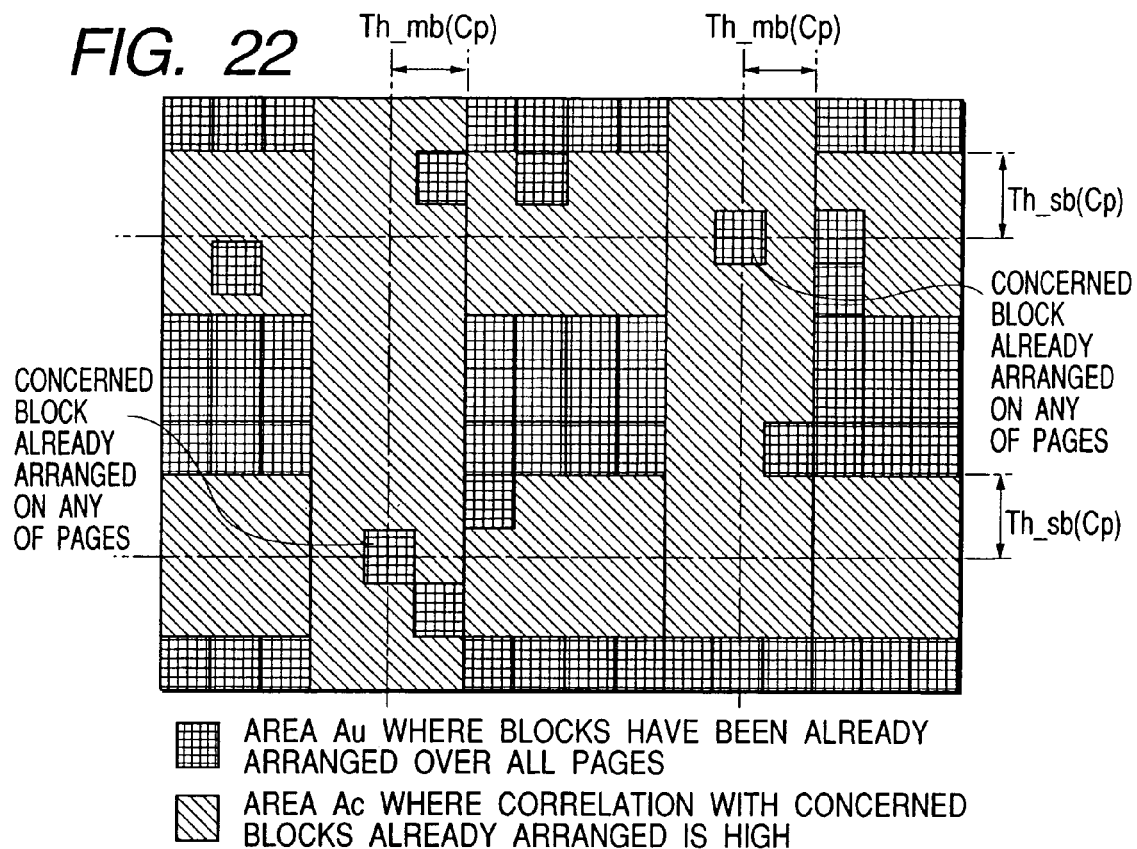
FIG. 22 is a view showing an example of the arrangement non-permission area in the fourth embodiment.

A step S407 calculates an arrangeable area Aa, by reducing the arrangement non-permission area Af from the entire block arrangement area A. FIG. 21 shows the arrangeable area Aa for the arrangement non-permission area shown in FIG. 20. The sequence proceeds to a step S408 or a step S414 respectively if the area Aa is vacant or not.

Figure 23:
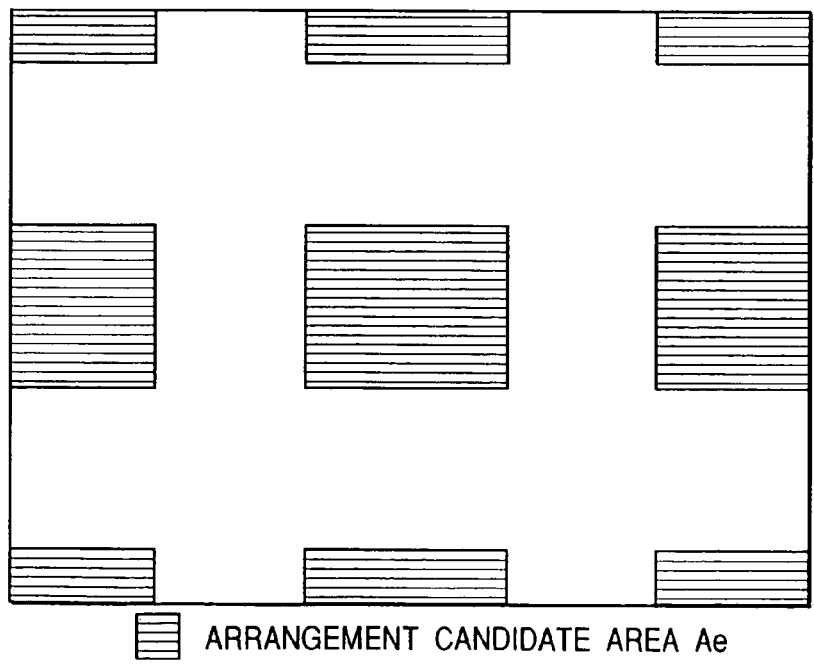
FIG. 23 is a view showing an example of the arrangement candidate area in the fourth embodiment.

The step S408 determines an arrangement candidate area Ae by reducing the area Ac from the area A. FIG. 23 shows the arrangement candidate area Ae for the area Ac shown in FIG. 22.

A step S409 randomly determines, in the arrangement candidate area Ae, an arrangement candidate page and an arrangement candidate spot for the concerned arrangement color.

A step S410 acquires the number Be of a block (hereinafter called rearrangement block) already arranged in the arrangement candidate page and the arrangement candidate spot, and discriminates whether the acquired block Be can be rearranged. Such discrimination will be explained with reference to FIGS. 24 and 25.

There is calculated an area Ac_c, other than the arrangement candidate spot, having a high correlation with the already arranged block Be. Then there is determined an area Ac_s as a sum of the above-mentioned area and the area Aua in which the block is already arranged over all the pages, and a rearrangeable area Ac_a is calculated by reducing the area Ac_s from the entire block arrangement area A. For example, if the area Ac_s is given as shown in FIG. 24, the rearrangeable area Ac_a is given as shown in FIG. 25. The rearrangement is judged impossible or possible respectively if the area Ac_a is vacant or not.

The sequence proceeds to a step S411 or S409 respectively if the rearrangement is judged possible or impossible.

The step S411 reduces the arrangement candidate spot from the arrangement candidate area Ae.

A step S412 discriminates that the block arrangement failed if the area Ae becomes vacant, whereupon the sequence proceeds to the step S403. If it is not vacant, the sequence proceeds to the step S409.

A step S413 rearranges the rearrangement block Be randomly in the area Ac_a, and also randomly determines the page of arrangement, excluding the page in which the block is already arranged in the arrangement spot. Thereafter the concerned arrangement block is arranged in the arrangement candidate spot, and the sequence proceeds to the step S415.

The step S414 randomly arranges the concerned arrangement block in the arrangeable area Aa, and also randomly determines the arrangement page, excluding the page in which the block is already arranged in the arrangement spot. Thereafter the sequence proceeds to the step S415.

If the step S415 identifies that the patch arrangement is completed for all the blocks, the sequence proceeds to the step S416, but, if the arrangement is not complete, the sequence proceeds to the step S405.

If the step S416 identifies that the arrangement of all the blocks has been executed for a predetermined number of times, the sequence proceeds to a step S417, but, if such predetermined number has not been reached, the sequence proceeds to the step S404.

The step S417 completes the patch image preparation.

In the following there will be explained the method for deriving the threshold value Th_mb(Bp) in the main scanning direction and the threshold value Th_sb(Bp) in the sub scanning direction for each block.

At first the threshold Th_m(Cp) and Th_s(Cp) are determined for each of all the patch colors. The threshold value Th_m(Cp) is determined from the correlation between the noise and the main scanning direction and from the dispersion of the noise, and the threshold value Th_s(Cp) is determined from the correlation between the noise and the sub scanning direction and from the dispersion of the noise. In calculating the threshold value Th_m(Cp) for the color patch Cp, there is at first calculated the correlation function fm(x) between the noise and the main scanning direction in the following manner:

$$fm(x) = \frac{1}{Rm} \int \int n(s,t)(s+x,t)dsdt$$

wherein n(s, t) indicates the noise signal at a position s in the x-direction and a position t in the y-direction, and Rm is a normalizing constant.

Then the correlation function fm(x) is normalized in the following manner by the noise dispersion v, thereby obtaining a function fmn(x):

$$fmn(x)=fm(x)/v$$

Then there is determined a value x for which the function fmn(x) becomes lower than a certain threshold value, and such value x is defined as the threshold value Th_m(Cp) for the color patch Cp. This relationship is sown in FIG. 9. In calculating the threshold value Th_s(Cp) for the color patch Cp, there is at first calculated the correlation function fs(y) between the noise and the sub scanning direction in the following manner:

$$fs(y) = \frac{1}{Rs} \int \int n(s,t)(s+t,y)dsdt$$

Then the correlation function fs(y) is normalized in the following manner by the noise dispersion v, thereby obtaining a function fsn(y):

$$fsn(y)=fs(y)/v$$

Then there is determined a value y for which the function fsn(y) becomes lower than a certain threshold value, and such value y is defined as the threshold value Th_s(Cp) for the color patch Cp. This relationship is shown in FIG. 10.

After determining the threshold values Th_m(Cp) and Th_s(Cp) for each of all the patch colors, there are determined the threshold value Th_mb(Bp) in the main scanning direction and the threshold value Th_sb(Bp) in the sub scanning direction for each block, in the following manner. If the block Bp contains n color patches $C_j, C_{j+1}, \ldots C_{j+n-1}$:

Th_mb(Bp)=Max(Th_m($C_j$), Th_m($C_{j+1}$), . . . , Th_m($C_{j+n-1}$))

Th_sb(Bp)=Max(Th_s($C_j$), Th_s($C_{j+1}$), . . . , Th_s($C_{j+n-1}$))

Thus, Th_mb(Bp) is determined from the maximum value of the threshold values in the main scanning direction of the contained color patches, and Th_sb(Bp) is determined from the maximum value of the threshold values in the sub scanning direction of the contained color patches.

In the following there will be explained the algorithm of information processing on the patch color signal information. In the patch image preparation, by outputting the patch images through image formation utilizing the patch n times for each color, the patch color signal information representing the measurement of such patch images can be obtained in n samples for each color. The result c(C) of the informa tion processing can be obtained by the following averaging calculation:

$$c(C) = \frac{1}{n}\sum_i s(C, i)$$

wherein s(C, i) is the patch color signal information of an i-th sample for a color C.

Such result c(C) of the information processing is defined as the result of patch color measurement.

The present embodiment allows, by patch arrangement over plural pages in consideration of the self correlation of the noise for each path color in the patch image preparation, to relax the influence of noise in the patch measurement thereby improving the accuracy. Also the present embodiment allows, by forming the patch image after formation of a block composed of plural patch images, to shorten the time required for patch image preparation and to reduce the patch arrangement order information, while maintaining the accuracy.

The foregoing first to fourth embodiments provide following advantages.

As explained in the foregoing, there is prepared a patch image in which plural patches are arranged for a same color, in consideration of the correlation of noise in each of all the patch colors used in the patch image. The patches are so arranged as to reduce the mutual influence of the noises resulting from the self correlation of the noises in the same patch color, so that the noise in a same patch color can be equivalently approximated by white noise. It is therefore rendered possible to eliminate the noise caused by averaging the measured information.

Thus, there can be prepared patch images capable of relaxing the influence of noise by averaging the measured information, with a fewer number of patch images.

Other Embodiments

Also the present invention includes a case where the program codes of a software realizing the functions of the aforementioned embodiments are supplied to a computer of a system or an apparatus connected to various devices in order to operate the devices so as to realize the functions of the aforementioned embodiments and the functions of the aforementioned embodiments are realized by operating the devices by the computer (CU or MPU) of the above-mentioned system or apparatus according to the program codes.

In such case the program codes themselves of the software realize the functions of the aforementioned embodiments, and the program codes themselves and the means for supplying the computer with such program codes, for example a recording medium storing the program codes, constitutes the present invention.

The recording medium storing such program codes can be, for example, a floppy disk, a hard disk, an optical disk, a magnetooptical disk, a CD-ROM, a CD-R, a magnetic tape, a non-volatile memory card or a ROM.

The present invention also includes such program codes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the recording medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A method for determining a position of arrangement of a patch in a patch image, comprising:
    a setting step, of setting kinds of patches included in the patch image in response to an instruction by a user;
    a selection step, of selecting an arrangement patch from the patches set in said setting step;
    a determination step, of determining an arrangement nonpermission area of the arrangement patch based on the position of the already arranged patch; and
    an arrangement step, of arranging the arrangement patch in an area other than the arrangement nonpermission area,
    wherein said method causes execution of said selection step, said determination step, and said arrangement step to all the patches set in said setting step.

2. The method according to claim 1, wherein the arrangement nonpermission area includes an area in which the patch has already been arranged and an area which is set based on a patch highly correlated with the arrangement patch and which highly correlates with the arrangement patch.

3. The method according to claim 2, wherein the area which highly correlates with the arrangement patch is an area which has predetermined widths, respectively, in a main scan direction and a sub-scan direction.

4. The method according to claim 1, wherein
    said setting step includes setting a number of same patches to be arranged, and
    said patch image preparation method includes repeating said selection step, said determination step, and said arrangement step on the basis of the number set in said setting step.

5. The method according to claim 1, wherein, when the arrangement patch cannot be arranged in the area other than the arrangement nonpermission area, the arrangement patch is arranged within the arrangement nonpermission area.

6. The method according to claim 1, wherein the patch image is used to judge a color reproduction characteristic of an output device of outputting said patch image.

7. A program stored on a computer readable medium, for performing, by a computer, a method for determining a position of arrangement of a patch in a patch image, said method comprising:
    a setting step, of setting kinds of patches included in the patch image in response to an instruction by a user;
    a selection step, of selecting an arrangement patch from the patches set in said setting step;

a determination step, of determining an arrangement nonpermission area of the arrangement patch based on the position of the already arranged patch; and an arrangement step, of arranging the arrangement patch in an area other than the arrangement nonpermission area, wherein said method causes executing said selection step, said determination step, and said arrangement step to all the patches set in said setting step.

8. An apparatus for determining a position of arrangement of a patch in a patch image, comprising:

a setting unit, adapted to set kinds of patches included in the patch image in response to an instruction by a user;

a selection unit, adapted to select an arrangement patch from the patches set by said setting unit;

a determination unit, adapted to determine an arrangement nonpermission area of the arrangement patch based on the position of the already arranged patch; and an arrangement unit, adapted to arrange the arrangement patch in an area other than the arrangement nonpermission area, wherein said apparatus causes execution of said selection unit, said determination unit, and said arrangement unit to all the patches set by said setting unit.

* * * * *

UNITED STATES PATENT AND TRADEMARK OFFICE
CERTIFICATE OF CORRECTION

| | |
|---|---|
| PATENT NO. | : 6,970,269 B1 |
| APPLICATION NO. | : 09/628347 |
| DATED | : November 29, 2005 |
| INVENTOR(S) | : Hirochika Matsuoka |

It is certified that error appears in the above-identified patent and that said Letters Patent is hereby corrected as shown below:

COLUMN 1

Line 50, "invention" should read --embodiment--; and
Line 60, "invention" should read --embodiment--.

COLUMN 2

Line 1, "invention" should read --embodiment--; and
Line 10, "invention" should read --embodiment--.

COLUMN 3

Line 46, "but" should read --bus--; and "processings" should read --processing--..

COLUMN 4

Line 41, "repetition" should read --repetitions--; and
Line 45, "repetition" should read --repetitions--.

COLUMN 5

Line 39, "Ac s" should read --Ac_s--.

COLUMN 7

Line 23, "repetition" should read --repetitions--; and
Line 58, "a" should read --an--.

UNITED STATES PATENT AND TRADEMARK OFFICE
CERTIFICATE OF CORRECTION

PATENT NO. : 6,970,269 B1
APPLICATION NO. : 09/628347
DATED : November 29, 2005
INVENTOR(S) : Hirochika Matsuoka It is certified that error appears in the above-identified patent and that said Letters Patent is hereby corrected as shown below:

COLUMN 8

Line 18, "n" should read --in--;
Line 65, "arrangement" should read --arrangements--; and
Line 66, "arrangement" should read --arrangements--.

COLUMN 9

Line 1, "arrangement" should read --arrangements--;
Line 2, "arrangement" should read --arrangements--;
Line 5, "have" should read --has--;
Line 16, "indicates" should read --indicate--; and
Line 49, "to 1" should read --to--.

COLUMN 12

Line 24, "sown" should read --shown--; and
Line 67, "informa" should read --informa---.

COLUMN 13

Line 15, "path" should read --patch--; and
Line 63, "a" should read --in a--.

COLUMN 15

Line 8, "to" should read --for--.

UNITED STATES PATENT AND TRADEMARK OFFICE
CERTIFICATE OF CORRECTION

PATENT NO. : 6,970,269 B1
APPLICATION NO. : 09/628347
DATED : November 29, 2005
INVENTOR(S) : Hirochika Matsuoka It is certified that error appears in the above-identified patent and that said Letters Patent is hereby corrected as shown below:

<u>COLUMN 16</u>

Line 11, "to" should read --for--.

Signed and Sealed this

Eighteenth Day of July, 2006

JON W. DUDAS
*Director of the United States Patent and Trademark Office*